(12) United States Patent
D'Avignon et al.

(10) Patent No.: US 9,547,609 B2
(45) Date of Patent: Jan. 17, 2017

(54) DATA INTERFACE FOR POINT-TO-POINT COMMUNICATIONS BETWEEN DEVICES

(71) Applicant: LSI Corporation, San Jose, CA (US)

(72) Inventors: Edward J. D'Avignon, Lakeville, MN (US); Keith R. Bloss, Schnecksville, PA (US); Semere T. Menghis, Minneapolis, MN (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 514 days.

(21) Appl. No.: 14/068,095

(22) Filed: Oct. 31, 2013

(65) Prior Publication Data

US 2015/0120981 A1    Apr. 30, 2015

Related U.S. Application Data

(60) Provisional application No. 61/895,768, filed on Oct. 25, 2013.

(51) Int. Cl.
| | |
|---|---|
| *G11B 5/09* | (2006.01) |
| *G06F 13/16* | (2006.01) |
| *G06F 13/40* | (2006.01) |
| *G11B 20/12* | (2006.01) |

(52) U.S. Cl.
CPC ....... *G06F 13/1668* (2013.01); *G06F 13/4063* (2013.01); *G11B 2020/1281* (2013.01)

(58) Field of Classification Search
CPC ............. G06F 13/1668; G06F 13/4063; G11B 2020/1281

USPC ............................................ 360/51, 48, 135
See application file for complete search history.

(56) References Cited

U.S. PATENT DOCUMENTS

| | | | | |
|---|---|---|---|---|
| 3,558,811 A | * | 1/1971 | Montevecchio | G06F 1/04 358/410 |
| 3,668,653 A | * | 6/1972 | Fair | G05B 19/371 700/1 |
| 4,310,895 A | * | 1/1982 | Edstrom | G06F 13/4221 710/100 |
| 4,394,733 A | * | 7/1983 | Swenson | G06F 12/0866 711/216 |
| 4,467,421 A | * | 8/1984 | White | G06F 3/0613 711/118 |
| 4,698,600 A | * | 10/1987 | Chapman | G01R 25/04 331/1 A |
| 4,769,839 A | * | 9/1988 | Preineder | H04L 12/43 370/458 |
| 4,803,481 A | * | 2/1989 | Mueller | H04L 29/06 370/468 |

(Continued)

*Primary Examiner* — Paul R Myers

(57) ABSTRACT

A data interface is provided for point-to-point communications between two devices, such as a read channel and a disk controller in an HDD system. An interface for communications from a transmitting device to a receiving device comprises a data bus configured to communicate m bits of data and a corresponding n bit data tag, wherein a given n bit data tag identifies a data type of a corresponding m bits of data on the data bus. An acknowledge signal from the receiving device optionally indicates that data on the data bus has been received and that the data on the data bus can be changed to a new value. A valid flag optionally indicates when a new predefined m-bit data value and corresponding n-bit tag value are on the data bus.

23 Claims, 8 Drawing Sheets

(56) References Cited

U.S. PATENT DOCUMENTS

| | | | | |
|---|---|---|---|---|
| 5,019,816 A * | 5/1991 | Hosono | ............... | G06F 3/0601 |
| | | | | 341/143 |
| 5,339,395 A * | 8/1994 | Pickett | ............... | G06F 13/385 |
| | | | | 370/463 |
| 5,384,671 A * | 1/1995 | Fisher | ............... | G11B 5/5526 |
| | | | | 360/49 |
| 5,787,132 A * | 7/1998 | Kishigami | ............ | H04L 7/042 |
| | | | | 370/304 |
| 5,938,728 A * | 8/1999 | Dwork | ................ | G06F 1/24 |
| | | | | 709/222 |
| 6,115,827 A * | 9/2000 | Nadeau-Dostie | ............ | G01R 31/31725 |
| | | | | 713/502 |
| 6,334,163 B1 * | 12/2001 | Dreps | ................ | G06F 5/06 |
| | | | | 710/260 |
| 6,415,349 B1 * | 7/2002 | Hull | ............... | G11B 20/10009 |
| | | | | 360/39 |
| 6,525,573 B1 * | 2/2003 | Guerrero Mercado | . | H03M 1/34 |
| | | | | 327/72 |
| 9,078,034 B2 * | 7/2015 | Citta | ............... | H04L 1/0041 |
| 2004/0190646 A1 * | 9/2004 | Aziz | ................ | H04L 25/061 |
| | | | | 375/319 |
| 2007/0247736 A1 * | 10/2007 | Sai | ................ | G11B 5/59627 |
| | | | | 360/51 |
| 2007/0266278 A1 * | 11/2007 | Nadeau-Dostie | ...... | G11C 29/50 |
| | | | | 714/719 |
| 2013/0135766 A1 * | 5/2013 | Grundvig | ........ | G11B 20/10509 |
| | | | | 360/51 |

* cited by examiner

FIG. 5
500

```
0 - srv DATA INVALID
1 - SAM (SAM QUALITY AND WHICH SAM WAS FOUND)
2 - GRAY CODE BITS 31:0
3 - GRAY CODE BITS 63:32 (ONLY USED WHEN NGRAY > 32)
4 - BURST A
5 - BURST B
6 - BURST C
7 - BURST D
8 - RRO STATUS (WHEN RRO_MD==2 OR 6)
9 - RRO BITS 31:0 (WHEN RRO_MD==2 OR 6)
A - RRO BITS 63:32 (WHEN RRO_LEN > 32 & RRO_MD==2 OR 6)
B - VGAS[8:0], FLAWSCAN, VGA & TA FLAGS
C - SAM2SAM AS SPECIFIED BY S2S0_MD[2:0]
D - SHS_MAG1[31:0] (WHEN SHS_EN==1)
E - SHS_MAG3[31:0] (WHEN SHS_EN==1)
F - QMON RESULTS (SQMCNT[25:0])
```

FIG. 6A
600

| BITS | FIELD |
|---|---|
| 31 | S_SAMTO (SAM TIMEOUT) |
| 30:18 | RESERVED |
| 17 | INV_POL (INVERTED SAM FOUND) |
| 16 | SAM_QUAL (SAM FOUND WITHOUT ERROR WHEN SET TO 1) |
| 15:7 | RESERVED |
| 6:0 | SAM_FND_PAT[6:0] (INDICATES WHICH OF THE 7 SAM PATTERNS WERE FOUND) |

FIG. 6B
650

| BITS | FIELD |
|---|---|
| 31:18 | RESERVED |
| 17:16 | RRO_SM[1:0] |
| 15:0 | RESERVED |
| 12:0 | RRO_TS[12:0] |

700

750

US 9,547,609 B2

DATA INTERFACE FOR POINT-TO-POINT COMMUNICATIONS BETWEEN DEVICES

CROSS-REFERENCE TO RELATED APPLICATIONS

The present application claims priority to U.S. Provisional Application Ser. No. 61/895,768, filed Oct. 25, 2013, entitled "Data Interface for Point-To-Point Communications Between Devices," incorporated by reference herein.

FIELD

The field relates generally to signal processing techniques, and more particularly to techniques for high speed point-to-point communications between devices.

BACKGROUND

Disk-based storage devices such as hard disk drives (HDDs) are commonly used to provide non-volatile data storage in a wide variety of different types of data processing systems. In such disk-based storage devices, a read channel typically sends Servo data to a disk controller over a 3-wire interface (up to 2 bits per cycle) or by requesting a register address over a standard Advanced Peripheral Bus (APB) or an Advanced High Performance Bus (AHB). A need remains for improved data interfaces for point-to-point communications between two devices, such as a read channel and a disk controller in an HDD system.

SUMMARY

Generally, a data interface is provided for point-to-point communications between two devices, such as a read channel and a disk controller in an HDD system. In one embodiment, an interface for communications from a transmitting device to a receiving device comprises a data bus configured to communicate m bits of data and a corresponding n bit data tag, wherein a given n bit data tag identifies a data type of a corresponding m bits of data on the data bus.

In one exemplary synchronous embodiment, the n bit data tag and the corresponding m bits of data change at substantially a same time relative to a servo clock. In another asynchronous embodiment, the n bit data tag and the corresponding m bits of data are stable for a predefined number of clock cycles after the n bit data tag changes.

The data bus optionally further communicates an acknowledge signal from the receiving device indicating that data on the data bus has been received and that the data on the data bus can be changed to a new value. The data on the data bus is optionally maintained until the one-bit acknowledge signal has been set by the receiving device. The data bus optionally further communicates a valid flag indicating when a new predefined m-bit data value and corresponding n-bit tag value are on the data bus.

In an exemplary read channel implementation, the transmitting device comprises read channel circuitry and the receiving device comprises a disk controller and wherein the data bus communicates one or more of Servo Address Mark (SAM) information, Gray Code information, burst demodulation information, Repeatable Runout (RRO) information, SAM to SAM data; Servo Harmonic Sensor (SHS) information and Servo status information.

Other embodiments of the invention include but are not limited to methods, apparatus, systems, processing devices, integrated circuits and computer-readable storage media having computer program code embodied therein.

BRIEF DESCRIPTION OF THE DRAWINGS

FIG. 5 provides a sample table indicating an exemplary assignment of each exemplary n-bit tag value to a corresponding data format to further specify assignment within the m-bit data value;

FIG. 6A is a sample table illustrating an exemplary bit assignment for exemplary SAM data;

FIG. 6B is a sample table illustrating an exemplary bit assignment for exemplary RRO data;

DETAILED DESCRIPTION

Embodiments of the invention will be illustrated herein in conjunction with exemplary disk-based storage devices write drivers and associated circuitry. While the present invention is illustrated in the context of an exemplary interface for exemplary communications between a read channel and a disk controller in an HDD system, it should be understood that these and other embodiments of the invention are more generally applicable to any environment in which improved point-to-point communications between devices are desired. Additional embodiments may be implemented using components other than those specifically shown and described in conjunction with the illustrative embodiments.

Figure 1:
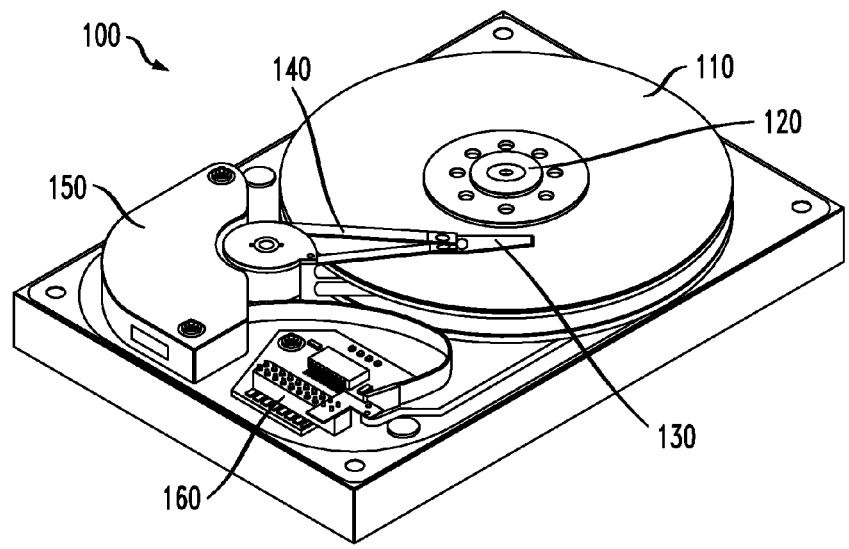
FIG. 1 shows a perspective view of a disk-based storage device in accordance with an illustrative embodiment of the invention.

FIG. 1 shows a disk-based storage device 100 in accordance with an illustrative embodiment of the invention. The storage device 100 in this embodiment more specifically comprises an HDD that includes a storage disk 110. The storage disk 110 has a storage surface coated with one or more magnetic materials that are capable of storing data bits in the form of respective groups of media grains oriented in a common magnetization direction (e.g., up or down). The storage disk 110 is connected to a spindle 120. The spindle 120 is driven by a spindle motor, not explicitly shown in the figure, in order to spin the storage disk 110 at high speed.

Data is read from and written to the storage disk 110 via a read/write head 130 that is mounted on a positioning arm 140. It is to be appreciated that the head 130 is shown only generally in FIG. 1. The position of the read/write head 130 over the magnetic surface of the storage disk 110 is controlled by an electromagnetic actuator 150. The electromagnetic actuator 150 and its associated driver circuitry in the present embodiment may be viewed as comprising a portion of what is more generally referred to herein as "control circuitry" of the storage device 100. Such control circuitry in this embodiment is assumed to further include additional electronics components arranged on an opposite side of the assembly and therefore not visible in the perspective view of FIG. 1.

The term "control circuitry" as used herein is therefore intended to be broadly construed so as to encompass, by way of example and without limitation, drive electronics, signal processing electronics, and associated processing and memory circuitry, and may encompass additional or alternative elements utilized to control positioning of a read/write head relative to a storage surface of a storage disk in a storage device. A connector 160 is used to connect the storage device 100 to a host computer or other related processing device.

It is to be appreciated that, although FIG. 1 shows an embodiment of the invention with only one instance of each of the single storage disk 110, read/write head 130, and positioning arm 140, this is by way of illustrative example only, and alternative embodiments of the invention may comprise multiple instances of one or more of these or other drive components. For example, one such alternative embodiment may comprise multiple storage disks attached to the same spindle so all such disks rotate at the same speed, and multiple read/write heads and associated positioning arms coupled to one or more actuators. Also, both sides of storage disk 110 and any other storage disks in a particular embodiment may be used to store data and accordingly may be subject to read and write operations, through appropriate configuration of one or more read/write heads.

A given read/write head as that term is broadly used herein may be implemented in the form of a combination of separate read and write heads. More particularly, the term "read/write" as used herein is intended to be construed broadly as read and/or write, such that a read/write head may comprise a read head only, a write head only, a single head used for both reading and writing, or a combination of separate read and write heads. A given read/write head such as read/write head 130 may therefore include both a read head and a write head. Such heads may comprise, for example, write heads with wrap-around or side-shielded main poles, or any other types of heads suitable for recording and/or reading data on a storage disk. Read/write head 130 when performing write operations may be referred to herein as simply a write head.

Also, the storage device 100 as illustrated in FIG. 1 may include other elements in addition to or in place of those specifically shown, including one or more elements of a type commonly found in a conventional implementation of such a storage device. These and other conventional elements, being well understood by those skilled in the art, are not described in detail herein. It should also be understood that the particular arrangement of elements shown in FIG. 1 is presented by way of illustrative example only. Those skilled in the art will recognize that a wide variety of other storage device configurations may be used in implementing embodiments of the invention.

Figure 2:
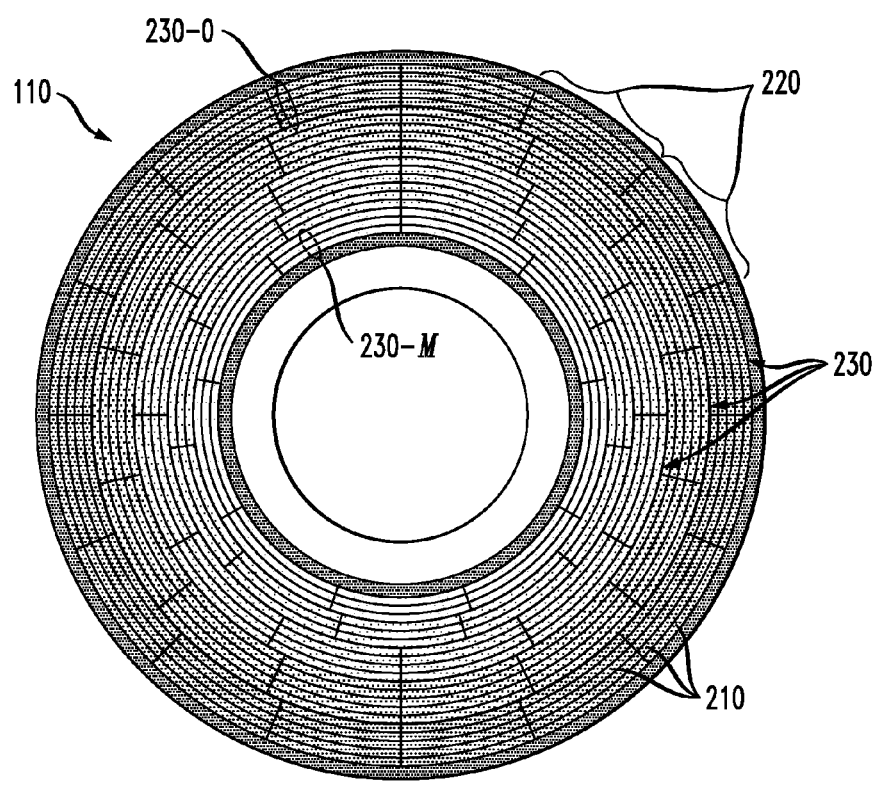
FIG. 2 shows a plan view of a storage disk in the storage device of FIG. 1.

FIG. 2 shows the storage surface of the storage disk 110 in greater detail. As illustrated, the storage surface of storage disk 110 comprises a plurality of concentric tracks 210. Each track is subdivided into a plurality of sectors 220 which are capable of storing a block of data for subsequent retrieval. The tracks located toward the outside edge of the storage disk have a larger circumference when compared to those located toward the center of the storage disk. The tracks are grouped into several annular zones 230, where the tracks within a given one of the zones have the same number of sectors. Those tracks in the outer zones have more sectors than those located in the inner zones. In this example, it is assumed that the storage disk 110 comprises M+1 zones, including an outermost zone 230-0 and an innermost zone 230-M.

The outer zones of the storage disk 110 provide a higher data transfer rate than the inner zones. This is in part due to the fact that the storage disk in the present embodiment, once accelerated to rotate at operational speed, spins at a constant angular or radial speed regardless of the positioning of the read/write head, but the tracks of the inner zones have smaller circumference than those of the outer zones. Thus, when the read/write head is positioned over one of the tracks of an outer zone, it covers a greater linear distance along the disk surface for a given 360° turn of the storage disk than when it is positioned over one of the tracks of an inner zone. Such an arrangement is referred to as having constant angular velocity (CAV), since each 360° turn of the storage disk takes the same amount of time, although it should be understood that CAV operation is not a requirement of embodiments of the invention.

Areal and linear bit densities are generally constant across the entire storage surface of the storage disk 110, which results in higher data transfer rates at the outer zones. Accordingly, the outermost annular zone 230-0 of the storage disk has a higher average data transfer rate than the innermost annular zone 230-M of the storage disk. The average data transfer rates may differ between the innermost and outermost annular zones in a given embodiment by more than a factor of two. As one example embodiment, provided by way of illustration only, the outermost annular zone may have a data transfer rate of approximately 2.3 Gb/s, while the innermost annular zone has a data transfer rate of approximately 1.0 Gb/s. In such an implementation, the HDD may more particularly have a total storage capacity of 500 Gigabytes (GB) and a spindle speed of 7200 revolutions per minute (RPM), with the data transfer rates ranging, as noted above, from about 2.3 Gb/s for the outermost zone to about 1.0 Gb/s for the innermost zone.

The storage disk 110 may be assumed to include a timing pattern formed on its storage surface. Such a timing pattern may comprise one or more sets of servo address marks (SAMs) or other types of servo marks formed in particular sectors in a conventional manner.

The particular data transfer rates and other features referred to in the embodiment described above are presented for purposes of illustration only, and should not be construed as limiting in any way. A wide variety of other data transfer rates and storage disk configurations may be used in other embodiments.

Figure 3:
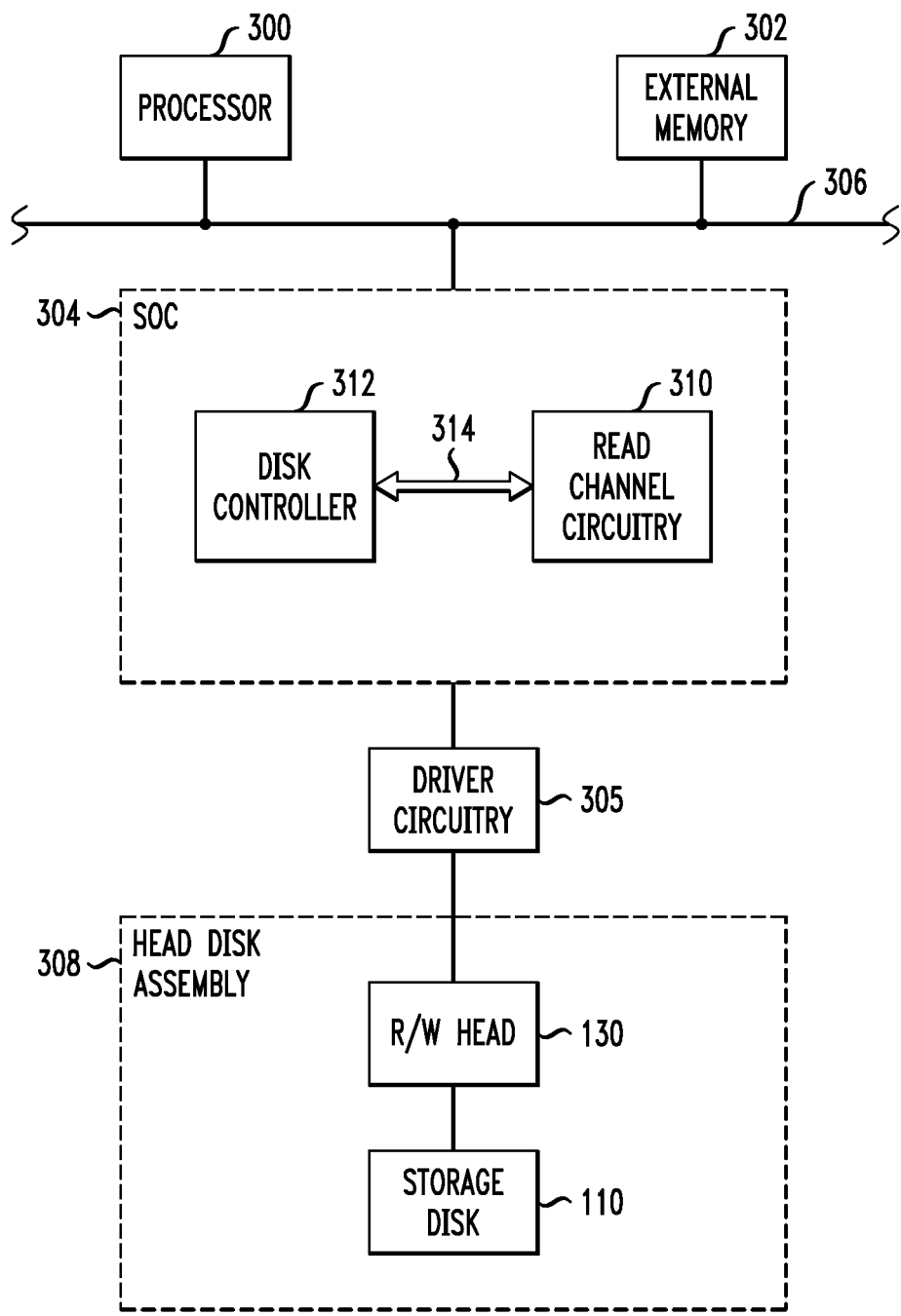
FIG. 3 is a block diagram of a portion of the storage device of FIG. 1 including an exemplary system-on-chip comprising a disk controller and read channel circuitry.

FIG. 3 shows a portion of the storage device 100 of FIG. 1 in greater detail. In this view, the storage device 100 comprises a processor 300, a memory 302 and a system-on-a-chip (SOC) 304, which communicate over a bus 306. The storage device further comprises driver circuitry 305 providing an interface between the SOC 304 and the read/write head 130. The driver circuitry 305 may comprise, for example, a preamplifier and other associated interface circuitry. The memory 302 is an external memory relative to the SOC 304 and other components of the storage device 100, but is nonetheless internal to that storage device. The read/write head 130 and storage disk 110 are collectively denoted in FIG. 3 as comprising a head disk assembly (HDA) 308.

The SOC 304 in the present embodiment includes read channel circuitry 310 and a disk controller 312, and directs the operation of the read/write head 130 in reading data from and writing data to the storage disk 110. The read channel circuitry 310 and the disk controller 312 communicate with one another over one or more interface connections 314 that may be viewed as representing a portion of the bus 306.

As discussed further below in conjunction with FIGS. 4 through 9, the exemplary interface connection 314 provides improved point-to-point communications between the exemplary read channel circuitry 310 and the exemplary disk controller 312 in accordance with aspects of the present invention.

The bus 306 may comprise, for example, one or more interconnect fabrics. Such fabrics may be implemented in the present embodiment as Advanced eXtensible Interface (AXI) fabrics, described in greater detail in, for example, the Advanced Microcontroller Bus Architecture (AMBA) AXI v2.0 Specification, which is incorporated by reference herein. The bus may also be used to support communications between other system components, such as between the SOC 304 and the driver circuitry 305. It should be understood that AXI interconnects are not required, and that a wide variety of other types of bus configurations may be used in embodiments of the invention.

The processor 300, memory 302, SOC 304 and driver circuitry 305 may be viewed as collectively comprising one possible example of "control circuitry" as that term is utilized herein. Numerous alternative arrangements of control circuitry may be used in other embodiments, and such arrangements may include only a subset of the components 300, 302, 304 and 305, or portions of one or more of these components. For example, the SOC 304 itself may be viewed as an example of "control circuitry." As noted above, the control circuitry of the storage device 100 in the embodiment as shown in FIG. 3 is generally configured to process data received from and supplied to the read/write head 130 and to control positioning of the read/write head 130 relative to the storage disk 110.

It should be noted that certain operations of the SOC 304 in the storage device 100 of FIG. 3 may be directed by processor 300, which executes code stored in external memory 302. For example, the processor 300 may be configured to execute code stored in the memory 302 for performing at least a portion of an ITI-based head position control process carried out by the SOC 304. Thus, at least a portion of the ITI detection and head position control functionality of the storage device 100 may be implemented at least in part in the form of software code.

The external memory 302 may comprise electronic memory such as random access memory (RAM) or read-only memory (ROM), in any combination. In the present embodiment, it is assumed without limitation that the external memory 302 is implemented at least in part as a double data rate (DDR) synchronous dynamic RAM (SDRAM). The memory 302 is an example of what is more generally referred to herein as a "computer-readable storage medium." Such a medium may also be writable.

Although the SOC 304 in the present embodiment is assumed to be implemented on a single integrated circuit, that integrated circuit may further comprise portions of the processor 300, memory 302, driver circuitry 305 and bus 306. Alternatively, portions of the processor 300, memory 302, driver circuitry 305 and bus 306 may be implemented at least in part in the form of one or more additional integrated circuits, such as otherwise conventional integrated circuits designed for use in an HDD and suitably modified to provide ITI-base head position control functionality as disclosed herein.

An example of an SOC integrated circuit that may be modified to incorporate an embodiment of the present invention is disclosed in U.S. Pat. No. 7,872,825, entitled "Data Storage Drive with Reduced Power Consumption," which is commonly assigned herewith and incorporated by reference herein.

Other types of integrated circuits that may be used to implement processor, memory or other storage device components of a given embodiment include, for example, a microprocessor, digital signal processor (DSP), application-specific integrated circuit (ASIC), field-programmable gate array (FPGA) or other integrated circuit device.

In an embodiment comprising an integrated circuit implementation, multiple integrated circuit dies may be formed in a repeated pattern on a surface of a wafer. Each such die may include a device as described herein, and may include other structures or circuits. The dies are cut or diced from the wafer, then packaged as integrated circuits. One skilled in the art would know how to dice wafers and package dies to produce packaged integrated circuits. Integrated circuits so manufactured are considered embodiments of the invention.

Although shown as part of the storage device 100 in the present embodiment, one or both of the processor 300 and memory 302 may be implemented at least in part within an associated processing device, such as a host computer or server in which the storage device is installed. Accordingly, elements 300 and 302 in the FIG. 3 embodiment may be viewed as being separate from the storage device 100, or as representing composite elements each including separate processing or memory circuitry components from both the storage device and its associated processing device. As noted above, at least portions of the processor 300 and memory 302 may be viewed as comprising "control circuitry" as that term is broadly defined herein.

Servo Fast Data Interface

As indicated above, the exemplary interface 314 provides improved point-to-point communications from the exemplary read channel circuitry 310 to the exemplary disk controller 312 in accordance with aspects of the present invention. The exemplary interface 314 is also referred to herein as a Servo Fast Data Interface (srv_fdi). The exemplary interface 314 is implemented as a 32-bit data bus (srv_fdi[31:0]) and a separate 4-bit (for example) tag bus (srv_fdi_tag[3:0]) indicating the type of data currently on the exemplary interface 314, as discussed further below in conjunction with FIG. 5. The 4-bit tag bus (srv_fdi_tag[3:0]) can be expanded to additional bits if more data fields are required. In addition, an optional one-bit valid flag (srv_fdi_valid) indicates when a new non-zero value is on the 32-bit bus (srv_fdi[31:0]) and the 4-bit tag bus (srv_fdi_tag [3:0]). While the exemplary embodiment is discussed herein using a 32-bit data bus (srv_fdi[31:0]) and a 4-bit tag bus (srv_fdi_tag[3:0]), in alternate embodiments, the number of bits on each bus can be varied and the two buses can be combined to form a single bus, as would be apparent to a person of ordinary skill in the art.

An optional one-bit acknowledge signal (srv_fdi_ack) from the disk controller 312 indicates that the current data has been received by the disk controller 312 and that the exemplary interface 314 can be changed by the exemplary interface 314 to the next value, to provide a handshake mechanism. In a handshake mode, the data does not change until after the one-bit acknowledge signal (srv_fdi_ack) is set to 1. In an exemplary non-handshake mode, the one-bit acknowledge signal (srv_fdi_ack) is permanently set to a value of 1. In a non-handshake mode, (where srv_fdi_ack is tied to 1) the value on the 32-bit data bus (srv_fdi[31:0]) is held for, for example, 3 cycles.

In this manner, each 32-bit value placed on the exemplary interface 314 is accompanied by a 4-bit tag on 4-bit tag bus (srv_fdi_tag[3:0]) that indicates the type of data on the 32-bit exemplary interface 314 srv_fdi[31:0]. The value on 4-bit tag bus (srv_fdi_tag[3:0]) changes at the same time as the data on 32-bit bus (srv_fdi[31:0]) and can be held until the next cycle at which srv_fdi_ack is set to binary one.

As discussed hereinafter, the exemplary interface 314 allows the disk controller 312 to receive data, such as Servo event status information, from the exemplary read channel circuitry 310. In the exemplary embodiment discussed herein, the exemplary interface 314 allows the disk controller 312 to receive the following exemplary data from the exemplary read channel circuitry 310:

Servo Address Mark (SAM) Found including SAM Status;
Gray Code;
Burst Demodulation Results;
Repeatable Runout (RRO) Status and Data;
SAM to SAM Distance Data;
Servo Harmonic Sensor Results; and
Servo Status.

Figure 4A:
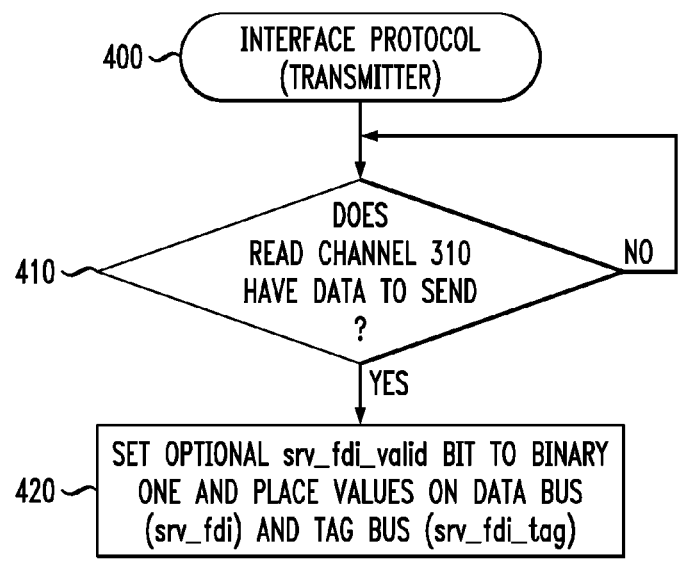
FIGS. 4A and 4B are flow charts illustrating an exemplary interface protocol implemented by the read channel circuitry and disk controller, respectively, of FIG. 3 to transfer data over the interface in accordance with aspects of the present invention.

FIG. 4A is a flow chart illustrating an exemplary interface protocol 400 implemented by the exemplary read channel circuitry 310 to send data over the interface 314 to the disk controller 312 in accordance with aspects of the present invention. As shown in FIG. 4A, once the exemplary read channel circuitry 310 has data to send (step 410), the exemplary read channel circuitry 310 will set the optional one-bit valid flag (srv_fdi_valid) to a value of binary one, and then place the data on the 32-bit data bus (srv_fdi[31:0]) and place the appropriate tag for the data on the 4-bit tag bus (srv_fdi_tag[3:0]) during step 420.

Figure 4B:
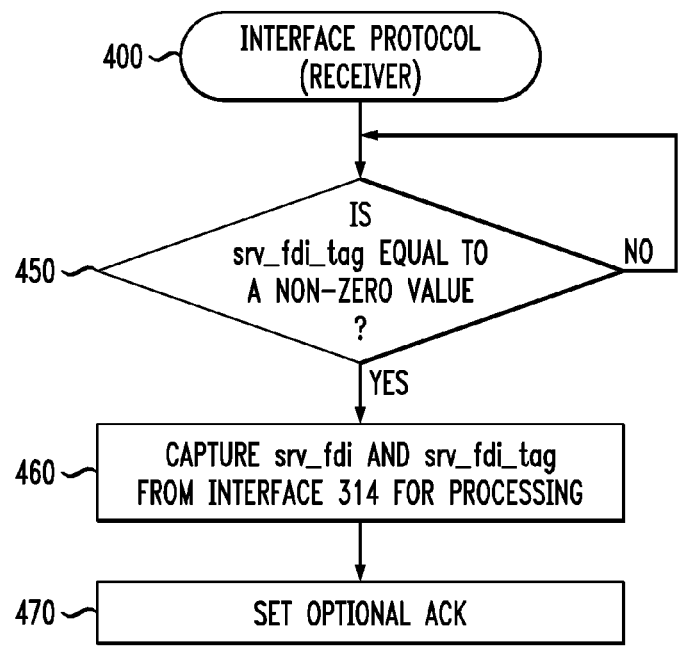

FIG. 4B is a flow chart illustrating an exemplary interface protocol 400 implemented by the disk controller 312 to obtain data over the interface 314 from the read channel circuit 310 in accordance with aspects of the present invention. As shown in FIG. 4B, the disk controller 312 will monitor the 4-bit tag bus (srv_fdi_tag[3:0]) on the interface 314 during step 450 for a non-zero value. When the disk controller 312 sees a non-zero value on the exemplary interface 314, the disk controller 312 will capture both srv_fdi and srv_fdi_tag from the interface 314 during step 460 for processing, and optionally set the one-bit acknowledge signal (srv_fdi_ack) once the data has been captured. It is again noted that the 4-bit tag bus (srv_fdi_tag[3:0]) indicates the type of data on the exemplary 32-bit bus (srv_fdi[31:0]).

As discussed further below in conjunction with FIG. 7, the srv_fdi[31:0], srv_fdi_valid and srv_fdi_tag[3:0] are synchronous to the rising edge of a one-bit servo clock (srv_clk), used in an optional synchronous mode. In a synchronous mode, the 4-bit tag bus (srv_fdi_tag[3:0]) and the 32-bit data bus (srv_fdi[31:0]) change at the same time relative to the servo clock (srv_clk). In an asynchronous mode, the data bus must be stable one cycle before and one cycle after the 4-bit tag bus (srv_fdi_tag[3:0]) tag changes.

In a handshake mode (not shown in FIGS. 4A and 4B), after capturing srv_fdi and srv_fdi_tag from the exemplary interface 314 during step 430, the disk controller 312 will set the exemplary one-bit acknowledge signal (srv_fdi_ack) to a value of binary one at which time the 4-bit tag bus (srv_fdi_tag[3:0]) shall be set to 0 until the next data field is available.

FIG. 5 provides a sample table 500 indicating an exemplary assignment of each exemplary 4 bit tag value to a corresponding data format to further specify assignment within 32 bits. For example, when the 4-bit tag bus (srv_fdi_tag[3:0]) is set to 0x1, additional information will be provided on the 32-bit bus (srv_fdi[31:0]) about the SAM. As discussed further below in conjunction with FIG. 6A, this additional information can include which SAM pattern was found, the SAM Quality and Timeout.

The Gray Code can be transferred on the 32-bit bus (srv_fdi[31:0]) after the SAM is found. As shown in FIG. 5, the first value transferred after the SAM is found is GRAYL [31:0] with a 4-bit tag of 0x2 and the second value transferred after the SAM is found is GRAYH[63:32] with a 4-bit tag of 0x3, when the number of gray bits (NGRAY) exceeds 32. Thus, the Gray Code can be transferred in one transfer if NGRAY is less than or equal to 32, and in two transfers if NGRAY is greater than 32.

Up to 4 data bursts can be present in a Servo Event and burst demodulation results are transferred on the exemplary interface 314. In an exemplary embodiment of the present invention, burst data is controlled based on a number of bursts (NBURSTS) and the selection of which results to place on the exemplary interface 314 is controlled by a 3-bit demodulation value (DEMOD_MD). Each burst is transferred separately on the exemplary interface 314.

Additional conventions can be established to transfer additional data on the exemplary interface 314, as would be apparent to a person of ordinary skill in the art. For example, RRO Data can be controlled by an RRO length valuate (RRO_LEN) and RRO mode (RRO_MD). Thus, the RRO Data can be transferred in one transfer if RRO_LEN is less than or equal to 32, and in two transfers if RRO_LEN is greater than 32.

The 32-bit data bus (srv_fdi[31:0]) bus can contain full 32-bit values or can be broken up into different, shorter values. For example, FIG. 6A is a sample table 600 illustrating an exemplary bit assignment for exemplary SAM data. Likewise, FIG. 6B is a sample table 650 illustrating an exemplary bit assignment for exemplary RRO data.

Figure 7A:
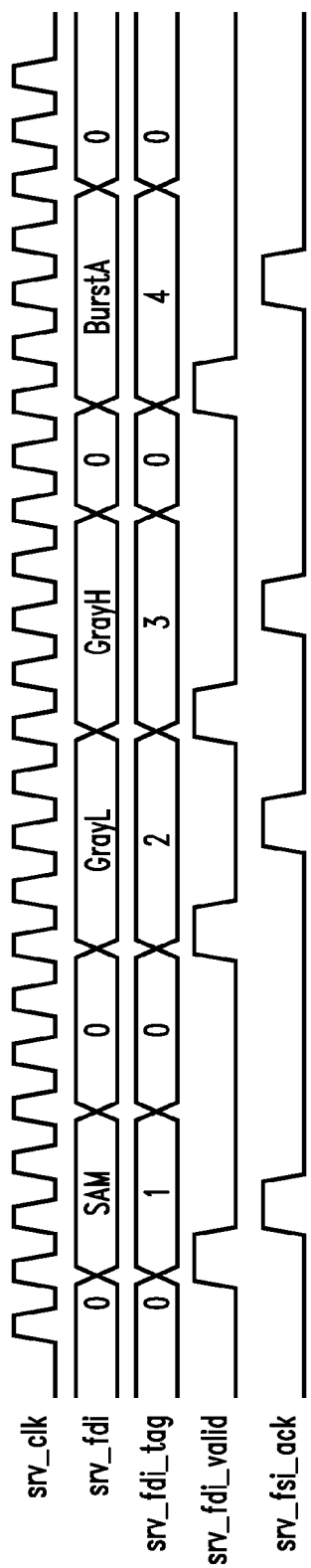
FIGS. 7A and 7B provide exemplary timing diagrams to illustrate the operation of the exemplary interface of FIG. 3.
Figure 7B:
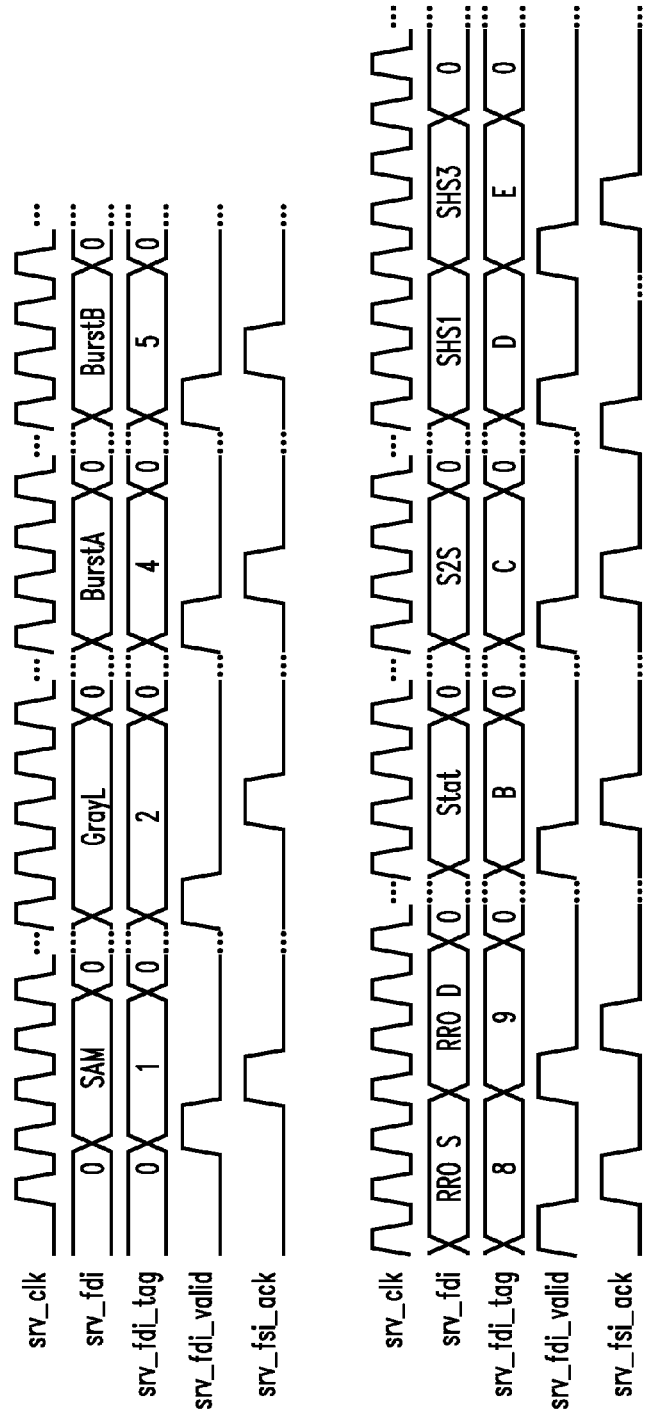

FIGS. 7A and 7B provide exemplary timing diagrams 700, 750 to illustrate the operation of the exemplary interface 314. In the example of FIG. 7A, the exemplary timing diagram 700 illustrates the various signals present on the exemplary interface 314 to transmit SAM information, two Gray Codes (where NGRAY>32) and one burst. As shown in FIG. 7A, the exemplary servo clock (srv_clk) runs at a 4T rate without gaps.

The one-bit valid flag (srv_fdi_valid) indicates when a new non-zero value is on the 32-bit bus (srv_fdi[31:0]) and the 4-bit tag bus (srv_fdi_tag[3:0]). The disk controller 312 will detect the non-zero values and capture the corresponding values on the 32-bit bus (srv_fdi[31:0]) and the 4-bit tag bus (srv_fdi_tag[3:0]). The captured value on the 32-bit bus (srv_fdi[31:0]) is interpreted based on the data type specified by the corresponding captured value on the 4-bit tag bus (srv_fdi_tag[3:0]).

As shown in FIG. 7A, both the 32-bit data bus (srv_fdi [31:0]) and the 4-bit tag bus (srv_fdi_tag[3:0]) are set to zero when there is no data to transmit. When the exemplary read channel circuitry 310 has data to send to the disk controller 312, the exemplary read channel circuitry 310 sets the one-bit valid flag (srv_fdi_valid) and places the data on the 32-bit data bus (srv_fdi[31:0]) with the corresponding data type of the data on the 4-bit tag bus (srv_fdi_tag[3:0]). For example, when transmitting the SAM data on the 32-bit data bus (srv_fdi[31:0]), the 4-bit tag bus (srv_fdi_tag[3:0]) is set to 0x1. In addition, when transmitting a Gray Code that exceeds 32 bits on the 32-bit data bus (srv_fdi[31:0]), the first Gray value (GRAYL[31:0]) is transferred with a 4-bit tag of 0x2 and the second value (GRAYH[63:32]) is transferred with a 4-bit tag of 0x3. A single data burst is then transferred on the exemplary 32-bit data bus (srv_fdi[31:0]) with a 4-bit tag of 0x4.

FIG. 7A also illustrates that the 32-bit data bus (srv_fdi[31:0]), 4-bit tag bus (srv_fdi_tag[3:0]) and the one-bit valid flag (srv_fdi_valid) are synchronous in the exemplary embodiment to the rising edge of the servo clock (srv_clk). In addition, the values on the exemplary buses will not change until two cycles after a rising edge of the one-bit acknowledge signal (srv_fdi_ack). The position of the rising edge of the exemplary one-bit acknowledge signal (srv_fdi_ack) may be delayed from the illustrative position shown in FIG. 7A.

In the example of FIG. 7B, the exemplary timing diagram 750 illustrates the various signals present on the exemplary interface 314 to transmit SAM data, a Gray Code (where NGRAY<32), two data bursts, RRO data, SAM2SAM data, Servo Harmonic Sensor (SHS) data and Status information. When the exemplary read channel circuitry 310 has data to send to the disk controller 312, the exemplary read channel circuitry 310 sets the one-bit valid flag (srv_fdi_valid) and places the data on the 32-bit data bus (srv_fdi[31:0]) with the corresponding data type of the data on the 4-bit tag bus (srv_fdi_tag[3:0]). For example, when transmitting the SAM data on the 32-bit data bus (srv_fdi[31:0]), the 4-bit tag bus (srv_fdi_tag[3:0]) is set to 0x1. In addition, when transmitting a Gray Code that does not exceed 32 bits on the 32-bit data bus (srv_fdi[31:0]), the Gray value (GRAYL[31:0]) is transferred with a 4-bit tag of 0x2. A first data burst is then transferred on the exemplary 32-bit data bus (srv_fdi[31:0]) with a 4-bit tag of 0x4 and a second data burst is then transferred on the exemplary 32-bit data bus (srv_fdi[31:0]) with a 4-bit tag of 0x5.

RRO status is then transferred on the exemplary 32-bit data bus (srv_fdi[31:0]) with a 4-bit tag of 0x8 and RRO data (up to 32 bits) is transferred on the exemplary 32-bit data bus (srv_fdi[31:0]) with a 4-bit tag of 0x9. Status data is then transferred on the exemplary 32-bit data bus (srv_fdi[31:0]) with a 4-bit tag of 0xB, followed by SAM-to-SAM data with a 4-bit tag of 0xC. SHS_MAG1 and SHS_MAG3 data are transferred with 4-bit tags of 0xD and 0xE, respectively. As shown in FIG. 7B, RRO Status/RRO Data and SHS_MAG1/SHS_MAG3 data can be sent without a gap between values.

As indicated above, the exemplary interface 314 is a synchronous, two-way interface that optionally includes an acknowledgement indicating that the data on the 32-bit data bus (srv_fdi[31:0]) has been captured by the disk controller 312 and can be changed by the exemplary read channel circuitry 310 to the next value. Thus, when the disk controller 312 captures the srv_fdi[31:0] data, the disk controller 312 sets srv_fdi_ack to a value of binary one. The one-bit acknowledge signal (srv_fdi_ack) can be launched on the rising edge of the servo clock (srv_clk) received by the controller to minimize the turn-around time of the acknowledgement. Once the exemplary read channel circuitry 310 (Servo) receives the one-bit acknowledge signal (srv_fdi_ack), the data on the 32-bit data bus (srv_fdi[31:0]) and the 4-bit tag bus (srv_fdi_tag[3:0]) may be changed. If no data is available, the exemplary read channel circuitry 310 sets the 32-bit data bus (srv_fdi[31:0]) and 4-bit tag bus (srv_fdi_tag[3:0]) to 0 until the next value to be transferred is available.

Only a single acknowledgement is processed for each 4-bit tag (srv_fdi_tag[3:0]) value. If the one-bit acknowledge signal (srv_fdi_ack) is set to one for multiple cycles prior to the 4-bit tag bus (srv_fdi_tag[3:0]) changing value, only the first occurrence of the one-bit acknowledge signal (srv_fdi_ack) set to one is recognized as an acknowledgement.

If a servo event ends without a required acknowledgement being received, the exemplary 32-bit data bus (srv_fdi[31:0]) and 4-bit tag bus (srv_fdi_tag[3:0]) hold the last value transferred until an acknowledgement (ack) is received. After the acknowledgement is received, the next valid tag shall be loaded on the 4-bit tag bus (srv_fdi_tag[3:0]). If no acknowledgement is received, the exemplary 32-bit data bus (srv_fdi[31:0]) and 4-bit tag bus (srv_fdi_tag[3:0]) continue holding the last value until the start of the next servo event.

In a "no handshake" mode (where srv_fdi_ack is held at 1), if a servo event ends and srv_fdi_ack continues being held at a value of one, the exemplary interface 314 continues transferring the data on srv_fdi[31:0] along with the corresponding tag on srv_fdi_tag[31:0]. If srv_fdi_ack goes to 0, then the 32-bit data bus (srv_fdi[31:0]) and 4-bit tag bus (srv_fdi_tag[3:0]) continue holding the last value until the start of the next servo event. In addition, the servo clock (srv_clk) continues toggling at the programmed rate until the start of the next servo event or until Servo Clock Select (SRVCKON) is changed. Generally, when SRVCKON is set to 0, the servo clock (srv_clk) toggles only during an active servo event until the last values on srv_fdi and srv_fdi_tag are acknowledged. When SRVCKON is set to 1, srv_clk toggles at all times. The changing of SRVCKON only stops the servo clock (srv_clk), the 32-bit data bus (srv_fdi[31:0]) and 4-bit tag bus (srv_fdi_tag[3:0]) do not change values.

Figure 8:
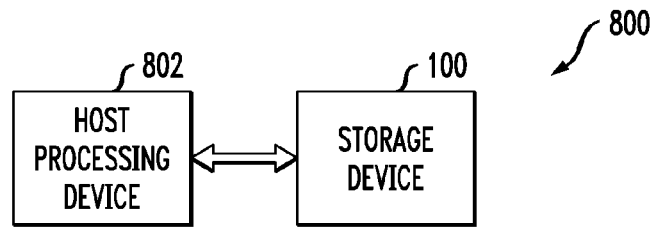
FIG. 8 illustrates interconnection of the storage device of FIG. 1 with a host processing device in a data processing system.

FIG. 8 illustrates a processing system 800 comprising the disk-based storage device 100 coupled to a host processing device 802, which may be a computer, server, communication device, etc. Although shown as a separate element in this figure, the storage device 100 may be incorporated into the host processing device. Instructions such as read commands and write commands directed to the storage device 100 may originate from the processing device 802, which may comprise processor and memory elements similar to those previously described in conjunction with FIG. 3.

Figure 9:
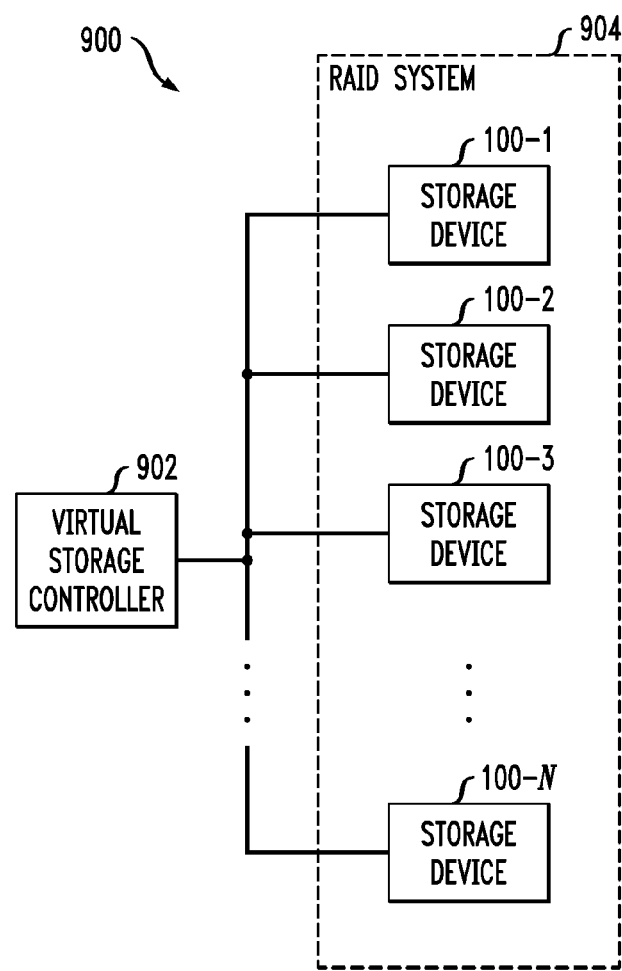
FIG. 9 shows a virtual storage system incorporating a plurality of disk-based storage devices of the type shown in FIG. 1.

Multiple storage devices 100-1 through 100-N possibly of various different types may be incorporated into a virtual storage system 900 as illustrated in FIG. 9. The virtual storage system 900, also referred to as a storage virtualization system, illustratively comprises a virtual storage controller 902 coupled to a RAID system 904, where RAID denotes Redundant Array of Independent storage Devices. The RAID system 904 more specifically comprises N distinct storage devices denoted 100-1, 100-2, . . . 100-N, one or more of which may be HDDs and one or more of which may be solid state drives. Furthermore, one or more of the HDDs of the RAID system 904 are assumed to include the exemplary interface 314 as disclosed herein. These and other virtual storage systems comprising HDDs or other storage devices of the type disclosed herein are considered embodiments of the invention. The host processing device 802 in FIG. 8 may also be an element of a virtual storage system such as system 900, and may incorporate the virtual storage controller 902.

While the exemplary interface 314 provides improved point-to-point communications from the exemplary read channel circuitry 310 to the exemplary disk controller 312 in accordance with aspects of the present invention, it is noted that the exemplary interface 314 can provide point-to-point communications from the exemplary disk controller 312 to the exemplary read channel circuitry 310, as well as bidirectional communications between the exemplary read channel circuitry 310 and the exemplary disk controller 312.

Again, it should be emphasized that the above-described embodiments of the invention are intended to be illustrative only. For example, other embodiments can use different types and arrangements of storage media, write heads, control circuitry, preamplifiers, write drivers and other storage device elements for implementing the described data interface 314 for point-to-point communications between devices, such as the exemplary read channel circuitry 310 and disk controller 312. These and numerous other alternative embodiments within the scope of the following claims will be apparent to those skilled in the art.

What is claimed is:

1. An interface for communications from a transmitting device to a receiving device, comprising:
   a processor configured to determine one of a plurality of data types corresponding with m bits of data;
   the processor further configured to, based on the determination of the one of the plurality of data types, determine a corresponding one of a plurality of multiple bit data tag associated with the one of the plurality of data types, wherein each one of the plurality of data types is associated with one of the plurality of multiple bit data tags, wherein a given multiple bit data tag identifies a data type of a corresponding m bits of data on said data bus;
   a data bus configured to communicate the m bits of data and the corresponding one of a plurality of multiple bit data tags;
   the transmitting device configured to transmit the m bits of data and the corresponding multiple bit data tag to the data bus, wherein the m bits of data and the corresponding multiple bit data tag are transmitted as individual and separate signals; and
   the plurality of data types comprising one or more of Servo Address Mark (SAM) information, Gray Code information, burst demodulation information, Repeatable Runout (RRO) information, SAM to SAM data, Servo Harmonic Sensor (SHS) information and Servo status information.

2. The interface of claim 1 wherein the m bits of data and the corresponding multiple bit data tag change at substantially a same time relative to a servo clock in a synchronous mode.

3. The interface of claim 1 wherein m bits of data tag and the corresponding multiple bit data tag stable for a predefined number of clock cycles after said corresponding multiple bit data tag changes in an asynchronous mode.

4. The interface of claim 1 wherein the data bus further communicates an acknowledge signal from the receiving device indicating that data on the data bus has been received and that the data on the data bus can be changed to a new value.

5. The interface of claim 4 wherein the data on the data bus is maintained until the acknowledge signal has been set by the receiving device.

6. The interface of claim 1 wherein the data bus further communicates a valid flag indicating when a new predefined m-bit data value and corresponding multiple bit tag are on the data bus.

7. The interface of claim 1 wherein a given m bits of data on said data bus is interpreted based on said corresponding multiple bit data tag.

8. The interface of claim 1 wherein the transmitting device comprises read channel circuitry and the receiving device comprises a disk controller and wherein the data bus communicates one or more of Servo Address Mark (SAM) information, Gray Code information, burst demodulation information, Repeatable Runout (RRO) information, SAM to SAM data; Servo Harmonic Sensor (SHS) information and Servo status information.

9. The interface of claim 1 wherein the communications are bidirectional between said transmitting device and said receiving device.

10. The interface of claim 1 wherein the data bus comprises a first bus configured to communicate said m bits of data and a second bus configured to communicate said corresponding multiple bit data tag.

11. The interface of claim 1 wherein the interface is fabricated in at least one integrated circuit.

12. The interface of claim 11 wherein the integrated circuit further comprises:
   at least one disk controller; and
   at least one read channel circuit.

13. A storage device comprising the interface of claim 1.

14. A virtual storage system comprising the storage device of claim 13.

15. A method for communicating from a transmitting device to a receiving device comprising the steps of:
   writing m bits of data to a data bus connecting said transmitting device and said receiving device;
   determining one of a plurality of data types of the m bits of data on said data bus,
   based on the one of the plurality of data types, determining one of a plurality of multiple bit data tags corresponding to said m bits of data,
   wherein the one of the plurality of multiple bit data tags identifies an associated on of a plurality of data type of the corresponding m bits of data on said data bus, wherein the plurality of data types comprises on or more of Servo Address Mark (SAM) information, Gray Code information, burst demodulation information, Repeatable Runout (RRO) information, SAM to SAM data, Servo Harmonic Sensor (SHS) information, and Servo status information; and
   writing the one of the plurality of multiple bit data tags to said data bus, wherein the transmitting device is configured to transmit the m bits of data and the corresponding multiple bit data tag to the data bus, wherein the m bits of data and the corresponding multiple bit data tag are transmitted as individual and separated signals.

16. The method of claim 15 wherein the m bits of data and the corresponding multiple bit data tag change at substantially a same time relative to a servo clock in a synchronous mode.

17. The method of claim 15 wherein the m bits of data and the corresponding multiple bit data tag are stable for a predefined number of clock cycles after said corresponding multiple bit data tag changes in an asynchronous mode.

18. The method of claim 15 further comprising the step of communicating an acknowledge signal from the receiving device indicating that data on the data bus has been received and that the data on the data bus can be changed to a new value.

19. The method of claim 18 further comprising the step of maintaining data on the data bus until the acknowledge signal has been set by the receiving device.

20. The method of claim 15 further comprising the step of communicating a valid flag indicating when a new predefined m bits of data and corresponding multiple bit tag are on the data bus.

21. The method of claim 15 wherein the transmitting device comprises read channel circuitry and the receiving device comprises a disk controller and wherein the data bus communicates one or more of Servo Address Mark (SAM) information, Gray Code information, burst demodulation information, Repeatable Runout (RRO) information, SAM to SAM data, Servo Harmonic Sensor (SHS) information and Servo status information.

22. The method of claim 15 wherein the data bus comprises a first bus configured to communicate said m bits of data and a second bus configured to communicate said corresponding multiple bit data tag.

23. A processing system comprising:
a processing device configured to determine one of a plurality of data types corresponding with m bits of data;
the processing device further configured to, based on the determination of the one of the plurality of data types, determine a corresponding one of a plurality of multiple bit data tag associated with the one of the plurality of data types, wherein each one of the plurality of data types is associated with one of the plurality of multiple bit data tags, wherein a given multiple bit data tag identifies a data type of a corresponding m bits of data on said data bus; and
an interface configured to communicate with a receiving device, comprising:
a data bus for communicating the m bits of data and the corresponding one of a plurality of multiple bit data tags,
wherein the plurality of data types comprises one or more of Servo Address Mark (SAM) information, Gray Code information, burst demodulation information, Repeatable Runout (RRO) information, SAM to SAM data, Servo Harmonic Sensor (SHS) information, and Servo status information,
wherein the interface is configured to transmit the m bits of data and the corresponding multiple bit data tag to the data bus, wherein the m bits of data and the corresponding multiple bit data tag are transmitted as individual and separate signals.

* * * * *